United States Patent [19]

Buysch et al.

[11] Patent Number: 4,754,066
[45] Date of Patent: Jun. 28, 1988

[54] AGE PROTECTION AGENTS, THE PRODUCTION THEREOF AND THE POLYMERS WHICH CONTAIN THEM

[75] Inventors: Hans-Josef Buysch, Krefeld; Zsolt Szentivanyi, Leverkusen; Josef Witte, Cologne, all of Fed. Rep. of Germany

[73] Assignee: Bayer Aktiengesellschaft, Leverkusen-Bayerwerk, Fed. Rep. of Germany

[21] Appl. No.: 844,078

[22] Filed: Mar. 26, 1986

Related U.S. Application Data

[63] Continuation of Ser. No. 624,346, Jun. 25, 1984, abandoned.

[30] Foreign Application Priority Data

Jul. 5, 1983 [DE] Fed. Rep. of Germany ....... 3324194

[51] Int. Cl.⁴ .......................................... C07C 149/267
[52] U.S. Cl. ..................... 564/221; 564/172; 564/222; 525/329.1; 524/217
[58] Field of Search ............... 564/221, 222, 202, 154, 564/192; 524/217; 525/329.1

[56] References Cited

U.S. PATENT DOCUMENTS 3,975,414  8/1986  Kline ................................. 564/221

FOREIGN PATENT DOCUMENTS 130522  1/1985  European Pat. Off. ............ 564/192
2361424  3/1978  France .

*Primary Examiner*—Anton H. Sutto
*Assistant Examiner*—Carolyn S. Greason
*Attorney, Agent, or Firm*—Connolly & Hutz

[57] ABSTRACT

Compounds corresponding to the formula

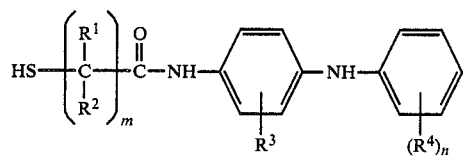

wherein
$R^1$ and $R^2$ represent H or $C_1$-$C_4$-alkyl,
$R^3$ represents H or $CH_3$,
$R^4$ represents $C_7$-$C_{20}$-aralkyl,
n represents 1 or 2, and
m represents an integer of from 1 to 12,
are suitable as ageing protecting agents for polymers and in particular for rubbers which are non-extractable in this form and may be added to polymers.

14 Claims, No Drawings

AGE PROTECTION AGENTS, THE PRODUCTION THEREOF AND THE POLYMERS WHICH CONTAIN THEM

This is a continuation of application Ser. No. 624,346 filed June 25, 1984, now abandoned.

The present invention relates to compounds corresponding to formula (I)

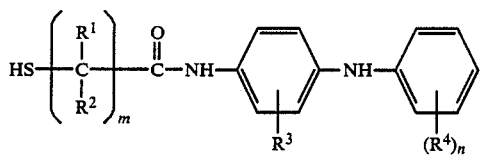

wherein
$R^1$ and $R^2$ represent H or $C_1$–$C_4$-alkyl,
$R^3$ represents H or $CH_3$
$R^4$ represents $C_7$–$C_{20}$-aralkyl
n represents 1 or 2 and
m represents an integer of from 1 to 12,
the production thereof and to the polymers which contain said compounds.

Polymers undergo rapid changes when exposed to light, air and heat and loose their useful properties by following decomposition and crosslinking operations. For this reason age protection agents are added to polymers which substantially prolong their life. In many cases the admixture of age protection agents is not sufficient for articles of every day use manufactured from polymers of this type and which come into contact with media which are capable of extracting the age protection agents and thereby substantially impairing or even negating the protective function thereof. It is also known that age protection agents migrate and bloom from the polymers.

It has been suggested in such cases that binding the age protection agents to the polymers or using polymeric age protection agents may prevent such problems arising.

DE-OS No. 2,735,178 describes a process in which age protection agents corresponding to the general formula

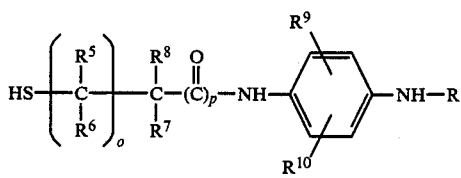

wherein
R represents, among others, phenyl which is optionally substituted by $C_1$–$C_4$-alkyl,
$R^5$–$R^{10}$ represent H or $C_1$–$C_5$-alkyl,
p represent 0 or 1 and
o represents from 0 to 12,
are bound to the polymer chain.

It can be shown that these age protection agents are at least partially fixed to the polymer and provide a certain limited age protection under extractive ageing conditions, but polymers which are equipped in this way have a noticeably poorer stability with regard to ageing than they would have had with known age protection agents which are not fixed and are based on amines such as distyryl diphenylamine.

A further disadvantage is found in the fact that these age protection agents appreciably restrict the scorch time and thereby the processing time of the polymer compositions which contain them.

Thus an object of the present invention is to provide age protection agents which not only guarantee an adequate processing time, and provide a good protective effect but may also be bound to polymers and thereby remain very effective under extractive conditions.

This object is solved by the compounds of formula I.
$R^1$ and $R^2$ are preferably H and methyl, more preferably H, n is preferably 1, m is preferably from 1 to 10 and more preferably from 2 to 6, $R^3$ is preferably H and $R^4$ is preferably aralkyl having from 7 to 18 and more preferably from 7 to 9 carbon atoms.

The compounds according to the present invention are produced by reacting 4-aminodiphenylamine derivatives corresponding to the formula (III)

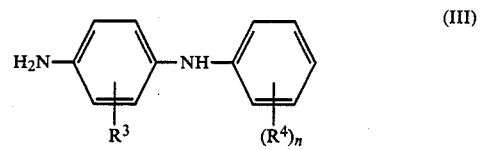

with mercapto carboxylic acid derivatives corresponding to the formulae (IV) or (V)

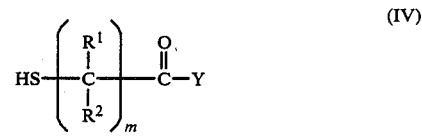

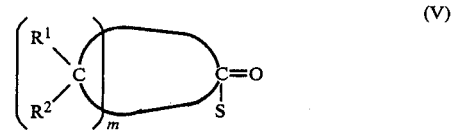

wherein $R^1$, $R^2$, $R^3$, $R^4$, m and n are as defined above and Y represents OH or $OR^1$.

The compounds corresponding to formula (III) are conventionally obtained by akylating 4-aminodiphenylamines with suitable alkylating agents such as alcohols, ethers, esters, halides or olefins.

Alkylation is generally carried out at a temperature of from 100° to 270° C. and in particular from 130° to 250° C. in substance or in inert solvents such as toluene, xylene, tetraline, cumene, diisopropylbenzene, chlorobenzene, o-dichlorobenzene, anisole or diphenyl ether, in the presence of an acid catalyst and in particular a catalyst having a $pK_s$-value of <2 (measured in water) which is used in a quantity of from 0.2 to 200%, by weight, in particular from 0.5 to 100%, by weight, based on the reaction constituents of the alkylating reaction.

The following are examples of suitable acid catalysts: hydrochloric acid, hydrobromic acid, sulphuric acid, sulphonic acids such as p-toluene sulphonic acid, phosphorous acid, phosphoric acid, phosphonic acids such as ethane phosphonic acid, acid-activated bleaching earths based on montmorillonites and bentonites and strong acid ion exchangers which may, for example, be based on sulphonated, cross-linked styrene-divinylbenzene-mixed polymers.

The molar ratio of the 4-aminodiphenylamines to the alkylating agents is generally from 1:5 to 5:1 and particularly from 1:2 to 2:1.

The reaction products may be purified, for example, by crystallisation or distillation, for subsequent reaction or may be subsequently processed without further purification.

The aralkyl group is preferably located in the p-position; however the products always contain a certain proportion of o-compound.

The following are examples of suitable starting materials for the production of the age protection agents according to the present invention: 4-aminodiphenylamine, as alkylating agents p-methyl-$\alpha,\alpha$ dimethylbenzyl alcohol, m-isopropyl-$\alpha,\alpha$-dimethylbenzyl alcohol and p-tert.-butyl-$\alpha,\alpha$-dimethylbenzyl alcohol, preferably benzyl chloride, benzyl alcohol, $\alpha$-methylbenzyl alcohol, $\alpha,\alpha$-dimethylbenzyl alcohol, $\alpha,\alpha$-dimethylbenzyl chloride, styrene, $\alpha$-methylstyrene, p-methylstyrene, $\alpha$,p-dimethylstyrene, p-ethylstyrene, m-isopropyl-$\alpha$-methylstyrene, p-tert.-butyl-$\alpha$-methylstyrene, 1,3-diphenylbutene-1, 2,4-diphenyl-4-methyl-pentene-1 and 2,4-diphenyl-4-methylpentene-2 and as mercapto carboxylic acid derivatives $\alpha$-mercaptoisobutyric acid and the methylesters thereof, $\beta$-mercapto-n-butyric acid and the ethylesters thereof, $\alpha$-mercaptopropionic acid, $\beta,\beta$-dimethyl-$\beta,\beta$-mercaptopropionic acid, $\omega$-mercapto-undecanic acid, mercaptoacetic acid, $\beta$-mercaptopropionic acid, $\gamma$-mercaptobutyric acid, $\delta$-mercaptovaleric acid and $\epsilon$-mercapto-hexanic acid and the methyl- and ethylesters of the latter acids and optionally the thiolactones thereof.

The mercapto-carboxylic acid amides corresponding to formula (I) are produced according to known methods from the 4-aminodiphenylamines corresponding to the formula (III) and the mercapto-carboxylic acid derivatives corresponding to the formulae (IV) and (V). By way of example, the mercapto carboxylic acids may be used and condensed to produce the amide with the elimination of water, effectively in the presence of an entrainer such as chlorobenzene or xylene. A preferred variant of the process is also the aminolysis of a mercapto carboxylic acid ester with the elimination of alcohol or the ring-opening acylation with a thiolactone.

The 4-aminodiphenylamines are reacted at a temperature of from 80° to 200° C. and preferably from 100° to 180° C.

The mercapto-carboxylic acids or the derivatives thereof are preferably used in an approximately equimolar quantity, based on the aminodiphenylamines corresponding to the formula (VIII).

The age protection agents corresponding to formula (I) may be bound to polymers in several ways, for example during the radical polymerisation of the above-mentioned monomers, preferably by addition to ready polymers and most preferably during the hardening and vulcanising of the polymers.

These reactions are carried out according to known processes in the presence of compounds (I) in composition, emulsion, solution or dispersion. The hardening of vulcanisation operations are carried out under conventional conditions and in the presence of known hardening and vulcanisation systems. The quantity of age protection agent is from 0.2 to 10%, by weight, preferably from 0.5 to 5%, by weight, based on the polymer.

The age protection agents (I) according to the present invention may also be added in a high concentration to polymers which have a molecular weight of from 1,000 to 30,000 (numerical average), preferably from 2,000 to 20,000, so that the polymers contain a bound-age protection agent content of from 10 to 60%, by weight, and preferably from 15 to 50%, by weight. Compounds of this type are then added to the high molecular weight polymers and also form active polymeric age protection agents which are resistant to migration and are difficult to extract. They are added to the high molecular weight polymers in such a quantity that the above-mentioned concentrations of age protection agents in the total polymer are obtained. To this end the polymers which have have a low mol weight and contain the age protection agents in a bound form are used in a quantity of from 1 to 25, preferably from 4 to 20%, by weight, based on the high molecular weight polymers.

Polymers which have a low mol weight and are suitable for addition reactions of this type are, for example, polybutadienes, polyisoprenes, mixed polymers of butadiene and/or isoprene with styrene, acrylonitrile, methylmethacrylate, ethylacrylate, $\alpha$-methylstyrene, piperylene, hexadiene-1,3, ethylene, propylene and vinyl acetate.

The age protection agents are added to the polymers under radical conditions, such as in the presence of known radical starters such as dicumyl peroxide, di-tert.-butylperoxide or azodiisobutyronitrile either undiluted or in inert solvents such as toluene, xylene, petroleum, chlorobenzene or dichlorobenzene at a temperature of from 50° to 200° C. and preferably from 70° to 180° C.

Suitable polymers which have a low molecular weight are also polymers which contain oxirane groups in addition to double bonds or exclusively oxirane groups, to which the mercapto-carboxylic acid amines corresponding to formula (I) are added. By way of example, these include epoxidated polybutadienes or epoxidated copolymers of butadiene or isoprene with ethylene, propylene, ethylacrylate or styrene, and moreover polymers consisting of acrylic acid glycide ester and copolymers with acrylic acid ethyl ester, ethylene, propylene, styrene, vinyl acetate with glycidyl acrylate.

The new age protection agents are suitable for a wide range of rubbers and plastics, but in particular for rubbers, such as for polymers consisting of 1,3-dienes such as butadiene, isoprene, piperylene, 2-chloro-butadiene, 2-ethyl-butadiene and the copolymers thereof with vinyl monomers, such as styrene, p-methylstyrene, $\alpha$-methylstyrene, norbornene, norbornadiene, acrylic acid, acrylic acid esters and -amides, acrylonitrile, ethylene, propylene and vinyl acetate, for polyalkenamers consisting, for example, of cyclopentene or 1,5-cyclooctadiene, and for polymers consisting of 1-olefin mixtures, such as of ethylene/propylene or ethylene/-propylene/diene having isolated double bonds. Polymers of this type may be produced by radical, coordinative, metathetic or ionic polymerisation.

Examples of polymers of this type include: natural rubber, SBR-, NBR-, EPDM- and CR-rubber, polypentenamer, also polyethylene, polypropylene or polystyrene having low double bond-contents, and finally mono- and multiphase polymer mixtures such as ABS or polystyrene, polyethylene, polypropylene, but preferably polymers which contain double bonds.

The age protection agents are particularly effective in nitrile rubber.

The rubbers may be vulcanised.

A further Improvement of the elongation at break can be obtained by addition of 5 to 15% by weight, based on rubber solids of oligomeric thioethers, e.g. Vulkanol 85 ® of BAYER AG, Leverkusen, Federal Republic of Germany.

EXAMPLE 1

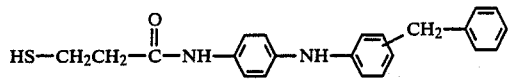

(a) 216 g (2 mols) of benzyl alcohol are added dropwise over a period of 1 hour to a mixture consisting of 184 g (1.0 mol) of 4-aminodiphenylamine and 20 g of acid-activated bleaching earth with stirring and under nitrogen at 200° C. The mixture is maintained for a further 3 hours at 200° C., and after dilution with toluene is filtered through a pressurized suction filter, the filtrate is evaporated and starting materials which were not reacted are distilled under reduced pressure and finally 280 g of a fraction containing small quantities of the dibenzyl-substituted compound in addition to the benzyl substituted 4-aminodiphenylamine at from 230° to 260° C./0.6–1.0 mbars.

(b) A mixture consisting of 137 g (about 0.5 mols) of the product from Ia, 53 g (0.5 mols) of β-mercapto-propionic acid and 250 ml of xylene are boiled in a water trap under reflux, nitrogen and with stirring until no more water can be separated. In total 7.3 ml of H₂O can be separated. The solution is evaporated to a sump temperature of 175° C./10 mbars and is thereby freed of xylene and mercapto-propionic acid which which has not been reacted. 168 g of a brown resin having an SH content of 8,4% by weight, that is 92% of the calculated value are obtained.

EXAMPLE 2

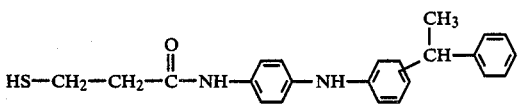

(a) 208 g (2.0 mols) of styrene are added dropwise to a mixtue consisting of 184 g (1.0 mol) of 4-aminodiphenylamine and 20 g of acid-activated bleaching earth at 200° C. with stirring and under nitrogen over a period of 2 hours and the mixture is maintained for a further hour at 200° C. After dilution with toluene, the mixture is filtered through a pressurized suction filter, the filtrate is distilled under reduced pressure and is freed of solvent and starting materials which have not been reacted. 286 g of the desired compound are changed at from 220° to 243° C./from 0.2 to 0.3 mbars.

(b) The mixture consisting of 144 g (about 0.5 mols) of the compound from 2a, 53 g (0.5 mols) of β-mercapto-propionic acid and 250 ml of xylene are boiled with stirring, under reflux and nitrogen in a water trap until 7.5 ml of water are separated. Then the solution is evaporated to a sump temperature of 170° C. under 10 mbars. 176 g of a brown resin having an SH content of 8,3% by weight corresponding to 94% of the calculated value are obtained.

EXAMPLE 3

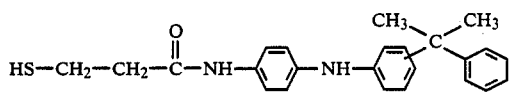

and

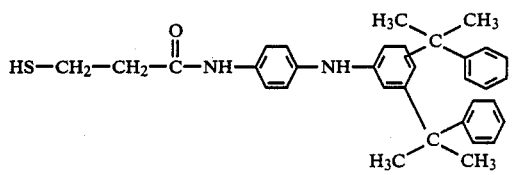

(a) 1,025 g (8.7 mols) of α-methylstyrene are added dropwise to a mixture consisting of 800 g (4.35 mols) of 4-aminodiphenylamine and 80 g of acid-activated bleaching earth with stirring and under nitrogen at 200° C. over a period of 2 hours, the mixture is maintained at 200° C. for a further hour, the reaction mixture which is diluted with toluene is filtered through pressurized suction filter and the filtrate is distilled under reduced pressure, solvents and starting materials which have not been reacted change first of all followed at from 236° to 255° C./0.3 mbars by a fraction I (787 g) which substantially consists of mono-alkylated compounds and then at from 268° to 288° C./0.3–0.5 mbars by a fraction II (530 g) which substantially consists of the dialkylated compounds.

(b) A mixture consisting of 151 g (about 0.5 mols) of the fraction I from 3a, 53 g (0.5 mols) of β-mercaptopropionic acid and 250 ml of xylene are allowed to react as in 2b until all the water has been separated (8.0 ml) and is worked up in the same manner. A slowly crystallizing brown resin (188 g) having a SH content of 8,4% by weight is obtained which corresponds to the calculated value.

EXAMPLE 4

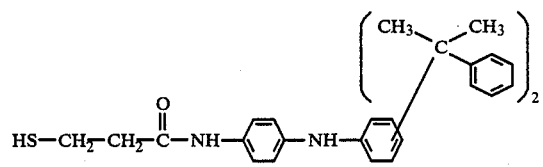

A mixture consisting of 210 g (about 0.5 mols) of the fraction II from 3a, 53 g (0.5 mols) of β-mercaptopropionic acid and 300 ml of xylene are reacted together as in 3b. 7.5 of H₂O and a dark brown resin having an SH content of 6,1% by weight are obtained, corresponding to 97% of the calculated value.

EXAMPLE 5

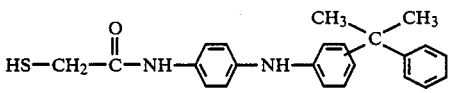

A mixture consisting of 151 g (about 0.5 mols) of the fraction I from 3a, 46 g (0.5 mol) of mercaptoacetic acid and 250 ml of xylene are reacted together as in 3b, 8.5 ml of H₂O being separated. 188 g of a light brown, slowly crystallising resin having an SH-content of 7.8% by weight are obtained, corresponding to 89% of the calculated value.

EXAMPLE 6

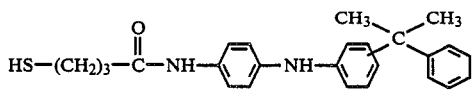

A mixture consisting of 151 g (about 0.5 mols) of the fraction I from 3a, 51 g (0.5 mols) of γ-thiobutyrolactone are heated to from 140° to 150° C. with stirring and under nitrogen over a period of 5 hours. The light brown resin which is formed has an SH-content of 7.3% by weight, corresponding to 89% of the calculated value.

EXAMPLE 7

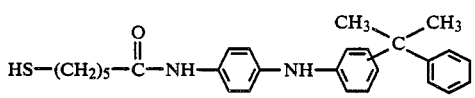

A mixture consisting of 151 g (about 0.5 mols) of the fraction I from 3a, 74 g (0.5 mols) of ε-mercaptocaproic acid and 300 ml of xylene are reacted together as in 3b and subsequently freed of volatile substances to a sump temperature of 180° C. under 1 mbar. A brown resin having an SH content of 7.3% by weight is obtained, corresponding to 95% of the calculated value.

EXAMPLE 8

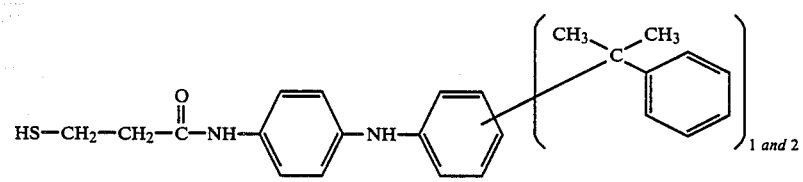

Example 3a is repeated, the red reaction product is not fractionally distilled but 132 g thereof are directly condensed with 41 g of β-mercapto-propionic acid after the separation of the starting materials which have not been reacted. A very deep brown resin having an SH content of 7.5% by weight is obtained.

EXAMPLE 9

Under exclusion of oxygen 50 g of polybutadiene having a 1,2-double bond proportion of 88% and a viscosity number $[\eta]=1.0$ dl/g (toluene, 80° C.) and 40 g of the compound according to Example 3b are dissolved in 200 ml of toluene. 1 g of azodiisobutyric acid nitrile are added and the mixture is heated with stirring to 80° C. over a period of 6 hours. After cooling to room temperature, the solution is mixed with 500 ml of methanol and the precipitated product is filtered off, washed with fresh methanol and dried at 50° C. under vacuum until there is a constancy of weight; Yield 75 g. Nitrogen content 2.55%, by weight; sulphur content 3.0%, by weight.

The reaction product subsequently contains 36%, by weight, of the ageing protecting agent chemically bound.

EXAMPLE 10

As is described in Example 9, 100 g of polybutadiene having a 1.2-double bond proportion of 58% and a viscosity number $[\eta]=0.6$ (toluene, 80° C.) are reacted with 40 g of the age protection agent according to Example 3b. Yield: 125 g, sulphur content 1.6% by weight. The product subsequently contains 20%, by weight, of chemically-bound age protection agent.

EXAMPLE 11

130 g of a copolymer consisting of 80%, by weight, of butadiene and 20%, by weight, of acrylonitrile having a molecular weight of 2,200 (numerical average) and 85 g of the ageing protecting agent from Example 3b are dissolved with the exclusion of oxygen in 100 ml of toluene. 5 g of azodiisobutyric acid nitrile are added and the mixture is heated to 80° C. over a period of 6 hours. After cooling to room temperature the substance is mixed with 500 ml of methanol and stirred for a period of 2 hours. The precipitated oil is separated and freed of the remaining solvent in the rotation evaporator Yield: 215 g; sulphur content: 3.3% by weight. The product subsequently contains 40%, bei weight, of chemically-bound age protection agent.

EXAMPLE 12

100 g of an epoxidated polybutadiene oil having a 4%, by weight, epoxide-oxygen content, a 38% vinyl double bond content and a molecular composition $M_n$ of 1,400 are dissolved with 50 ml of toluene and mixed with 70 g of the compound from Example 3b. The mixture is heated to 80° C. and a solution of 0.1 g of triethylamine in 10 ml of toluene are added and the reaction temperature is increased with stirring to 100° C. After 5 hours the mixture is cooled to room temperature. Volatile proportions are drawn off in the rotation evaporator at 70° C., under 20 mm Hg pressure. 170 g of a viscous oil are obtained which has a sulphur content of 3.3% by weight.

EXAMPLE 13

An NBR rubber consisting of 72% by weight of butadiene and 28% by weight of acrylonitrile are vulcanised according to the following composition in the presence of the age protection agents. according to the present invention.

100.00 parts, by weight, of NBR
0.75 parts, by weight, of stearic acid
3.0 parts, by weight, of zinc oxide
1.5 parts, by weight, of mercapto-silane
2.5 parts, by weight, of a mixture consisting of fatty acid and fatty acid esters
30.0 parts, by weight, of precipitated silica
30.0 parts, by weight, of kaolin, calcinated 0.25 parts, by weight, of sulphuric granulated material 80%
2.5 parts, by weight, of tetramethyl thiuram disulphide
2.0 parts, by weight, of dibenzothiazyl disulphide
2.0 parts, by weight, of ageing protecting agent A-D
  A=distyryl diphenyl amine
  B=the compound from Example 3b
  C=comparative product No. II from the over view on p. 15 of DE-OS No. 2,735,178
  D=polymers from Example 11*
*5 parts by weight of the polymer having an ageing protecting agent content of 40%, by weight, are used so that the addition of age protection agent is 2 parts, by weight, as given.

The formulation was mixed in a 3.5-1 kneading apparatus at 35 rpm, a pressure of the die of 8 bar, a starting temperature of 40° C. and a mixing time of 4,5 minutes.

|  | A | B | C | D |
|---|---|---|---|---|
| Mooney Scorch 120° C. (min) | 25 | 20 | 10 | 25 |
| Vulcameter t$_{10}$ (min) | 2.5 | 2.8 | 1.7 | 2.7 |
| 170° t$_{70}$ (min) | 3.7 | 3.7 | 2.6 | 3.6 |
| Vulcanisation 20' 170° C. Standard rod II |  |  |  |  |
| Tensile strength (MPa) | 12.0 | 13.1 | 12.8 | 15.1 |
| Elongation at break % | 390 | 490 | 740 | 530 |
| Hardness RT Shore A | 62 | 63 | 62 | 61 |
| Ageing under hot air 135° C. Measurements after 10 days, cellular furance |  |  |  |  |
| Tensile strength MPa | 11.6 | 12.2 | 6.8 | 10.7 |
| Elongation at break % | 215 | 250 | 60 | 210 |
| Hardness RT Shore A | 71 | 68 | 81 | 68 |

From the measurements it can be seen that:
1. Comparative product C according to DE-OS No. 2,735,178 causes very short prevulcanisation duration as opposed to the products according to the present invention and the Comparative sample A.
2. C has a substantially worse ageing protection (rapid drop of the elongation at break) than the commercial aminic ageing protecting agent A.
3. The products B and D according to the present invention virtually correspond to the age protection agent A, as far as the prevulcanisation time is concerned, the protective effect thereof is considerably better than that of C and at least equal or slightly better than that of A.

EXAMPLE 14

An NBR rubber consisting of 72% by weight of butadiene and 28% by weight of acrylonitrile is vulcanised according to the following formulation in the presence of the stabilizers according to the present invention:
100.00 parts, by weight, of NBR
0.75 parts, by weight, of stearic acid
3.0 parts, by weight, of zinc oxide
1.5 parts, by weight, of mercapto silane
2.5 parts, by weight, of a mixture consisting of fatty acid and fatty acid esters
30.0 parts, by weight, of precipitated silica
30.0 parts, by weight, of kaolin, calcinated
0.25 parts, by weight, of sulphuric granulated material 80%
2.0 parts, by weight, of zinc salt of the 4- or 5-methyl-mercapto-benzimidazol
2.0 parts, by weight, of tetramethyl thiuram disulphide
2.0 parts, by weight, of dibenzothiazyl disulphide
2.0 parts, by weight, of age protection agents A-F A=distyryldiphenylamine
B=Example 6
C=Example 7
D=Example 8
E=Example 2b
F=Example 1b
The mixing was performed according to Example 13.

|  | A | B | C | D | E | F |
|---|---|---|---|---|---|---|
| Mooney Scorch 120° C. (min) | 26 | 20 | 21 | 21 | 22 | 22 |
| Vulcameter t$_{10}$ (min) | 3.1 | 3.1 | 2.9 | 3.2 | 3.0 | 3.0 |
| 170° C. t$_{70}$ (min) | 3.7 | 3.8 | 3.8 | 4.0 | 3.8 | 3.8 |
| Vucanisation 20' 170° C. Standard rod II |  |  |  |  |  |  |
| Tensile strength (MPa) | 13.1 | 13.8 | 13.5 | 14.4 | 13.4 | 13.7 |
| Elongation at break (%) | 380 | 490 | 480 | 510 | 510 | 500 |
| Hardness RT (Shore A) | 66 | 64 | 64 | 63 | 63 | 63 |
| Storage in fuel C 48 hrs. 40° C. Back drying under vacuum 48 hrs. 40° C. |  |  |  |  |  |  |
| Ageing under hot air 135° C. cellular furnace 11 days |  |  |  |  |  |  |
| Tensile strength (MPa) | 6.5 | 9.0 | 10.4 | 9.4 | 9.6 | 9.3 |
| Elongation at break (%) | 90 | 160 | 160 | 160 | 150 | 135 |
| Hardness RT (Shore A) | 73 | 71 | 73 | 71 | 72 | 72 |

It can be seen from the measurements that:
The products B, C, D, E, F according to the present invention have a substantially better protective effect as far as ageing under hot air is concerned after storage in fuel. This means that they cannot be extracted, unlike product A of the prior art.

EXAMPLE 15

An NBR rubber of 72% by weight of butadiene and 28% by weight of acrylonitrile was vulcanised according to the formulation of Example 14 D in the presence or absence of an oligomeric ether-thioether. The formulation was mixed in a 1.3-1 kneading apparatus at 35 rpm, a pressure of the die of 8 bar, a starting temperature of 40° C. and a mixing time of 3 minutes.
A: absence of etherthioether
B: 5 parts by weight of Vulkanol 85
C: 10 parts by weight of Vulkanol 85 each respecting as to 100 parts by weight of rubber.

|  | A | B | C |
|---|---|---|---|
| Mooney Scorch 120° C. (min.) | 18 | 18 | 18 |
| Vulkameter t$_{10}$ (min.) | 2,5 | 2,5 | 2,5 |
| 170° t$_{10}$ (min.) | 3,4 | 3,7 | 3,8 |
| Vulcanisation 20' 170° C. Standard rod II |  |  |  |
| Tensile strength (MPa) | 20,7 | 23,1 | 20,8 |
| Elongation at break (%) | 530 | 650 | 660 |
| Hardness RT Shore A | 63 | 58 | 56 |
| Ageing and hot air 150° C., 72 hours |  |  |  |
| Tensile strength F/F$_o$ (%) | 76 | 65 | 74 |
| Elongation at break |  |  |  |
| D/D$_o$ (%) | 77 | 72 | 82 |
| Δ Hardness RT H-H$_o$ Shore A | +7 | +7 | +6 |

From the measurements it can be seen that the effectiveness of the inventive age protection agents can be enhanced by the addition of thioethers. The dosage must corrspond to the formulation.

We claim:

1. Compounds corresponding to the formula

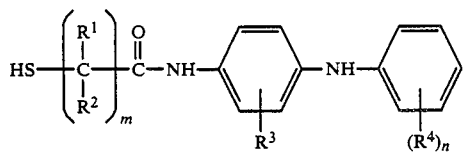

wherein
R¹ and R² represent H or $C_1$-$C_4$-alkyl,
R³ represents H or $CH_3$
R⁴ represents $C_7$-$C_{20}$-aralkyl
n represents 1 or 2 and
m represents an integer of from 1 to 12.

2. Compounds according to claim 1, wherein
R¹ and R² represent hydrogen or methyl,
R³ represents hydrogen,
R⁴ represents aralkyl having from 7 to 18 carbon atoms,
n represents 1 and
m represents from 1 to 10.

3. The compound according to claim 2 wherein R⁴ is

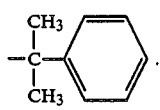

4. Compounds according to claim 1, wherein
R¹, R² and R³ represent hydrogen,
R⁴ represents aralkyl having from 7 to 9 carbon atoms,
n represents 1 and
m represents from 2 to 6.

5. The compound according to claim 4 wherein R⁴ is benzyl and m is 2.

6. The compound according to claim 4 wherein R⁴ is

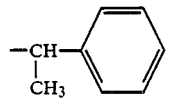

and m is 2.

7. The compound according to claim 4 wherein R⁴ is

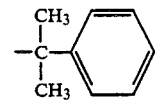

and m is 2.

8. The compound according to claim 4 wherein R⁴ is

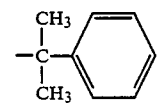

and m is 3 or 5.

9. The compound according to claim 1 wherein R¹, R² and R³ are H, R⁴ is

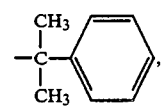

m is 2 and n is 1 or 2.

10. Polymers containing compounds according to claim 1.

11. Rubbers and vulcanisates of rubbers containing compounds according to claim 1.

12. Nitrile rubbers and vulcanisates of nitrile rubbers containing compounds according to claim 1.

13. Polymers according to claim 10, containing from 0.2 to 10% by weight of compounds according to claim 1.

14. Rubbers and vulcanisates of the rubbers according to claim 11 containing additionally 5 to 15% by weight, based on rubber solids, of an oligomeric thioether.